Nov. 4, 1941.   S. F. PELLAS ET AL   2,261,560
METHOD AND APPARATUS FOR REMOVING COFFEE BEANS FROM THE BERRY
Filed Feb. 6, 1940
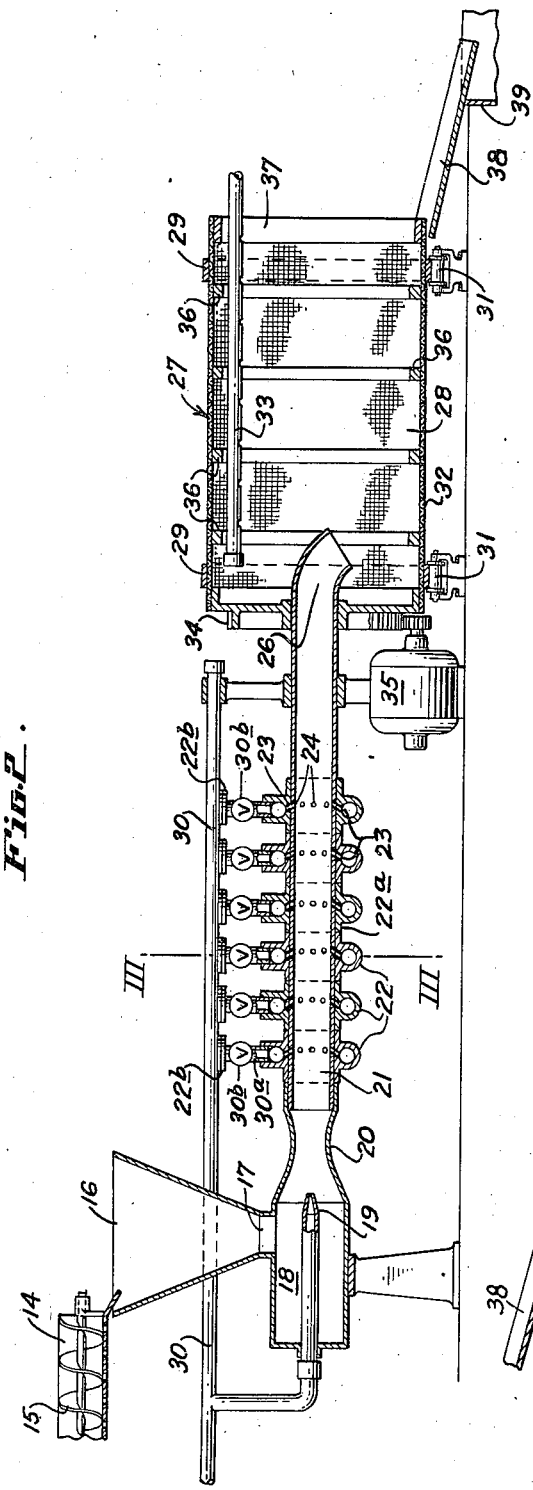
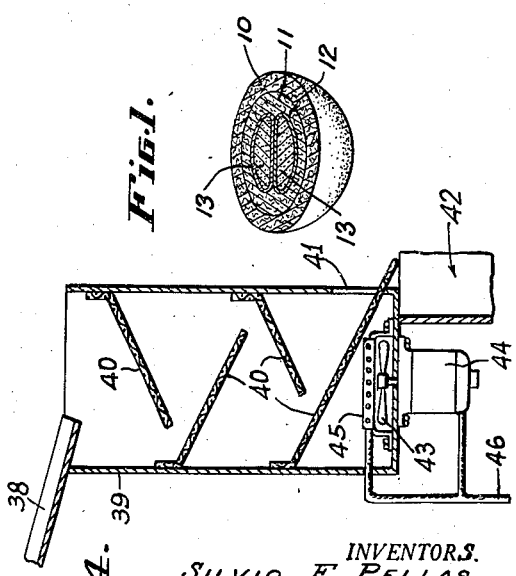
INVENTORS.
SILVIO F. PELLAS
MAX KRAUT
BY
ATTORNEY.

Patented Nov. 4, 1941

2,261,560

UNITED STATES PATENT OFFICE 2,261,560

METHOD AND APPARATUS FOR REMOVING COFFEE BEANS FROM THE BERRY

Silvio F. Pellas, Hillsborough, and Max Kraut, San Francisco, Calif.; said Kraut assignor to said Pellas Application February 6, 1940, Serial No. 317,534

12 Claims. (Cl. 83—94)

This invention relates to improvements in method and apparatus for washing and preparing for the market coffee beans which have been harvested in their natural state. It is to be observed that coffee beans are the seed or kernel of the coffee berry. This coffee berry as picked in its natural state from the tree consists of an inner kernel of two coffee beans which nest with their flat faces relatively opposed. Each of the beans has a closely adhering enclosing envelope of a thin parchment-like skin known as sacca. Surrounding the sacca skin is an intermediate layer of gummy substance sometimes referred to as lees, the latter being in turn surrounded by an outer covering of fleshy material which constitutes an outer hull. The intermediate layer of gummy substance and the outer hull are of approximately the same thickness, but both are relatively thick as compared to the thickness of the thin parchment-like sacca skin. Under pressure, the outer hull readily separates from the gummy layer by extrusion, very much in the manner of separating the inner pulp from the skins of Concord grapes. The intermediate gummy layer, however, holds tenaciously to the coffee beans and is very difficult to remove. In the present practice, the crude or natural berries, as they come from the tree, are subjected to pressure by any suitable mechanical means, which squeezes the inner coffee beans with the sacca skin and layer of gum, out of the hull. The outer hulls are then separated from the gum-covered beans by simple screening through a proper size mesh. Subsequently, the gum-covered beans are subjected to a fermentation process for approximately twenty-four to forty-eight hours which renders the gummy substance of such consistency that by then passing the beans through a simple rinsing or washing process, practically all of the fermentation products resulting from the decomposition of the gummy material, may be removed from the sacca skin of the beans. The washed beans, including the sacca skin thereon, are then dried by spreading them in large patios or in trays over relatively large areas and air dried over a considerable period of time. Sometimes, the drying process is accelerated by following the air drying with drying by artificial means such as applying heat in mechanically operated driers. The drying process loosens the parchment or sacca skin of the coffee bean and the skin may then be readily separated by any suitable and well-known means known to the art, such as a milling machine and wind blower, similar to those employed in removal of bran from wheat. A disadvantage of the present practice as above described is that the long contact of the fermentation products of the gummy substance with the bean imparts to the finished coffee a disagreeable and objectionable taste, thus impairing its marketable qualities. It is highly desirable that any processes or apparatus employed for removing the outer hull and the gummy layer should not destroy the sacca skin around the coffee bean, until after the cleaning steps have been completed and the beans go through the step of drying.

It is an object of this invention to improve the marketable qualities of the coffee bean by elimination of the fermentation process of the gummy substance and to greatly reduce the time required at present in preparing coffee beans for market, both by elimination of the time and deleterious effects of the fermentation and reducing the time of drying.

It is further the object of this invention to provide apparatus by which the steps of the method herein described may be carried out expeditiously and economically and in a continuous line of action.

With the foregoing and other objects in view, one form which the invention may take is disclosed in the steps of the method set forth herein, and in the apparatus herein described and illustrated in the accompanying drawing. It is to be understood that it is not intended that the invention be limited by the examples set forth herein, since variations of minor details may be resorted to without departing from the spirit and scope of the invention as set forth in the claims appended hereto.

In the accompanying drawing:

Fig. 1 is a perspective sectional view of a coffee berry.

Fig. 2 is a vertical longitudinal section of one form of an apparatus employed in carrying out the invention.

Fig. 3 is an enlarged vertical transverse section on line III—III of Fig. 2.

Fig. 4 is a drier.

For purposes of describing the method, reference will also be made to the apparatus illustrated herein as one form of means for carrying out the steps of the method.

In Fig. 1, 10 represents the outer hull of the coffee berry, 11 the intermediate gummy layer or substance, 12 the sacca skin, and 13 the coffee beans.

Referring to Fig. 2, there is provided a conventional feed trough 14 having a spiral conveyer 15 therein by which the natural coffee berries are separated into a continuous line of substantially individual units so that they are fed in a continual line of more or less individual units to hopper 16, the latter being narrowed at its bottom as at 17 whereby the berries are fed in a line into the chamber 18. The chamber 18 has therein a nozzle 19 for ejecting a jet of water under high pressure, the discharge end of which is positioned slightly forwardly of and adjacent to the narrowed opening 17 so that the high pressure fluid jet provides a suction to draw the berries into the chamber and into the path of the high pressure fluid jet, for the purpose of tearing and shredding the body of the layers surrounding the bean and sacca skin. In the forward or discharge portion of the chamber 18, the walls thereof are converged as at 20 for the purpose of guiding the berries, in line arrangement directly into the path of the high pressure jet. Manifestly, the high pressure jet will also serve to carry the berries forward. It is desirable to subject all sides of the berries to the action of the high pressure liquid, so that the beans may be cleaned on all sides. One way by which this may be accomplished is by providing at the converging or discharge end 20 of the chamber 18 a communicating elongated tube 21 having tubular ring jets 22 intermittently spaced thereon. These tubular ring jets are supplied through ducts 30ᵃ with water under pressure from the same supply line 30 which also supplies water under pressure to the nozzle 19. The inner circumference of each ring jet 22 is provided with a plurality of orifices 23 which register with orifices 24 in tube 21 so that as the berries pass through these ring jets they are struck from all sides by impact of the high pressure liquid. It is preferred that the orifices 23, 24 of the ring jets and tube be offset slightly from the perpendicular in the same direction as the flow of the water from the jet 19 so as not to resist such flow, but to assist the flow and carry the beans and removed material with it. The orifices of the ring jets and the elongated tube may be cleaned by separating the ring jet at the joint 25, removing the lower section 22ᵃ and disconnecting a threaded joint 22ᵇ at the conduit 30.

The head pressure of the fluid from the respective jets may vary according to the type of berry being run through the apparatus. The purpose of high pressure is to shred and tear the surrounding substances from the coffee bean without injury to or tearing of the sacca skin from the bean. For different types of berries, and dependent on various factors, such as the degree of ripeness, 100 pounds pressure per square inch has been found to work efficiently, but with other types of berries fluid pressures of 200 to 300 pounds per square inch have been found desirable. It is, therefore, not intended to limit the process to a specific pressure so long as the pressure is sufficiently high to have a shredding or tearing action on the surrounding substances which it is desired to remove. Nor is it intended that the tube 21 shall be limited to the number of ring jets 22 illustrated in the drawings, as the number of operating ring jets may be controlled by cut-off valves 30ᵇ. The tube 21 should be of such length, and the ring jets 22 of such number, that by the time the berries have reached the tube outlet 26 the coffee beans are separated completely from the surrounding coatings, though they are not separated from the sacca skin. From the downwardly curved discharge end 26 of the tube 21, the sacca-coated coffee beans and the residue-bearing fluid is fed into a suitable washer 27 which preferably is a cylinder or drum 28 mounted for horizontal rotation on circumferential external ring tracks 29 which ride on rollers 31. The outer wall 32 of the drum comprises a screen of a mesh which will permit residue-bearing water to flow through, but is too fine to permit the coffee beans to pass. A sprayer 33 supplies a water spray to the washer. The washer is rotated by a gear drive 34 and motor 35. As the washer is rotated, the circumferential ribs 36 measurably delay the advance of the coffee beans through the washer, so that by the time they have reached the discharge opening at the opposite end 37, the coffee beans are thoroughly washed and are discharged through the open end of the washer onto a chute 38 which carries them to any suitable trays or bins 39 from which they are dried in any suitable manner, which may include supplemental artificial heat. There is diagrammatically shown by way of illustration, a drying means in bin 39 in which are mounted a series of vertically spaced superposed or relatively overlying shelves 40 inclined at an angle of slippage, upon the uppermost of which the wet coffee beans are received from chute 38. The shelves 40 may be reticulated fine mesh screen or otherwise perforated, and the coffee beans slide progressively downwardly from one shelf to the next below, the moisture thereon evaporating meanwhile. The beans are finally discharged through opening 41 of bin 39 into a gathering receptacle 42. To facilitate drying of the beans in bin 39, a fan 43 may be mounted in the bottom of bin 39, the fan being rotated by motor 44. The fan 43 may circulate air through an electrical heating element 45, the electrical current being supplied to both motor 44 and heating element 45 by conduits 46. The vibration of motor and fan may also facilitate the sliding of the beans on the shelves 40. It is to be borne in mind that this illustrated drying means is merely an example, and no invention is claimed in its mechanical structure, since it is contemplated that any suitable drying means may be employed, or the beans may be dried by spreading upon an open space and merely exposing to atmospheric temperature.

The essential feature of the invention is the method and the apparatus for removing the surrounding body material from the sacca-covered coffee bean. It is immaterial to the invention whether the method and apparatus are employed with berries treated in their natural state from the tree; that is, including both the outer hull and the intermediate gummy material, or whether it is preferred to first mechanically extrude the inner gummy substance and beans from the outer hull, and then employ the foregoing method and apparatus to remove the intermediate layer of gummy material from the coffee bean. Whichever of these types of operation are employed, it is the removal of the said covering layers by high-pressure water jets which constitutes the novelty. In either case, the fermenting of the coffee berry is totally eliminated with the consequent elimination of the undesirable flavor which is imparted to the coffee thereby. A further advantage is accomplished in that where the covering coatings are removed by the foregoing method, the sacca of the coffee bean not having been appreciably saturated in a fermentation process, will dry in much reduced time after it comes out of the apparatus. The means for supplying high pressure to the liquid of conduit 30 may be any suitable type of pump or ram, not illustrated, since the particular type does not constitute any part of the novelty of this invention.

We claim:

1. A method of separating coffee beans from the surrounding intermediate layer of gummy material of the coffee berry, including the step of subjecting the beans and the surrounding layer of gummy material to the impact of jets of liquid under substantially high pressure until the gummy material is removed from the bean, conveying the beans and removed material with the liquid flow of said jets, and thereafter separating the beans from the liquid impregnated with the gummy material.

2. A method of separating coffee beans from the surrounding intermediate layer of gummy material of the coffee berry, including the steps of subjecting the beans and the surrounding layer of gummy material to the impact of jets of liquid under substantially high pressure until the gummy material is removed from the bean, conveying the beans and removed material with the liquid flow of said jets, and thereafter separating the beans from the liquid impregnated with gummy material, and drying said beans.

3. A method of separating coffee beans from the surrounding intermediate layer of gummy material of the coffee berry, including the steps of subjecting the beans and the surrounding layer of gummy material to the impact of jets of liquid under substantially high pressure until the gummy material is removed from the bean, conveying the beans and removed material with the liquid flow of said jets, and washing from the beans the liquid impregnated with gummy material.

4. A method of separating coffee beans from the surrounding layers of material of the coffee berry, including the steps of subjecting the berry to pressure until the coffee bean and the attached gummy layer are extruded from the outer hull thereof, separating the outer hull from the extruded portion, subjecting the beans and the attached surrounding layer or gummy material to the impact of jets of liquid under substantially high pressure until the gummy material is removed from the bean, conveying the beans and removed material with the liquid flow of said jets, and thereafter separating the beans from the liquid impregnated with the gummy material.

5. A method of separating coffee beans from the surrounding layers of material of the coffee berry, including the steps of subjecting the berry to pressure until the coffee bean and the attached gummy layer are extruded from the outer hull thereof, separating the outer hull from the extruded portion, subjecting the beans and the surrounding layer of gummy material to the impact of jets of liquid under substantially high pressure until the gummy material is removed from the bean, conveying the beans and removed material with the liquid flow of said jets, and washing from the beans the liquid impregnated with gummy material.

6. A method of separating coffee beans from the surrounding layers of material of the coffee berry, including the steps of feeding the berries substantially in line formation, subjecting the berries while in substantial line formation to the impact of jets of liquid under substantially high pressure to remove the surrounding layers from the bean, conveying the beans and removed material with the liquid flow of said jets, and thereafter separating the beans from the liquid carrying the removed particles of outer hull and intermediate gummy material of the berry.

7. A method of separating coffee beans from the surrounding layers of material of the coffee berry, including the steps of inducing a flow of berries in substantial line formation, subjecting the berries while in line formation and simultaneous with the flow thereof to the impact of jets of liquid under substantially high pressure to remove the surrounding layers from the bean conveying the beans and removed material with the liquid flow of said jets, and washing from the beans, the liquid carrying the removed particles of the outer hull and intermediate gummy material of the berry.

8. An apparatus for separating coffee beans from the surrounding layers of the coffee berry, including a tubular chamber for respectively receiving and discharging coffee beans with their surrounding coating, said chamber having a plurality of circumferentially disposed high pressure jet nozzles adapted for spraying jets of high pressure liquid against said surrounding coating, and screen means for receiving the beans and the liquid impregnated with the removed portions of the coating, said screen being of a mesh to retain the coffee beans and to permit the impregnated liquid to pass therethrough.

9. An apparatus for separating coffee beans from the surrounding layers of the coffee berry, including an elongated tubular chamber for respectively receiving and discharging coffee beans with their surrounding coating, said chamber having a plurality of circumferentially disposed high pressure jet nozzles adapted for spraying jets of high pressure liquid against said surrounding coating, and screen means for receiving the beans and the liquid carrying the removed portions of the coverings, said screen being of a mesh to retain the coffee beans and to permit the impregnated liquid to pass therethrough.

10. An apparatus for separating coffee beans from the surrounding layers of the coffee berry, including an elongated tubular chamber for respectively receiving and discharging coffee beans with their surrounding coating, said chamber having a plurality of high pressure jet nozzles circumferentially arranged in the chamber and adapted for spraying jets of high pressure liquid against said surrounding coating, said jet nozzles being angularly inclined in the direction of flow, and screen means for receiving the beans and the liquid carrying the removed portions of the coverings, said screen being of a mesh to retain the coffee beans and to permit the impregnated liquid to pass therethrough.

11. An apparatus for separating coffee beans from the surrounding layers of the coffee berry, including an elongated tubular chamber for respectively receiving and discharging coffee beans with their surrounding coating, said chamber being provided with a plurality of high pressure jet nozzles circumferentially arranged in the chamber and adapted for spraying jets of high pressure liquid from various angles against said surrounding coating, said jet nozzles being angularly inclined in the direction of flow, and screen means for receiving the beans and the liquid carrying the removed portions of the coverings, said screen being of a mesh to retain the coffee beans and to permit the impregnated liquid to pass therethrough.

12. An apparatus for separating coffee beans from the surrounding layers of the coffee berry, including an elongated tubular chamber for respectively receiving and discharging coffee beans with their surrounding coating, said chamber being provided with a plurality of high pressure jet nozzles adapted for spraying jets of high pressure liquid against said surrounding coating, and screen means for receiving the beans and the liquid carrying the removed portions of the coverings, said screen being of a mesh to retain the coffee beans and to permit the impregnated liquid to pass therethrough, and means for washing the impregnated liquid from the coffee berries.

SILVIO F. PELLAS.
MAX KRAUT.